United States Patent [19]

Woodcock

[11] 4,134,418
[45] Jan. 16, 1979

[54] MANUAL FLUID PRESSURE CONTROLLER
[75] Inventor: Glenn Woodcock, Spanish Lake, Mo.
[73] Assignee: Wagner Electric Corporation, St. Louis, Mo.
[21] Appl. No.: 804,523
[22] Filed: Jun. 8, 1977
[51] Int. Cl.² ............................................. G05D 16/10
[52] U.S. Cl. ............................. 137/116.5; 137/627.5; 251/256; 303/54
[58] Field of Search .......................... 137/116.5, 627.5; 303/54, 59; 251/256

[56] References Cited
U.S. PATENT DOCUMENTS

| 2,087,356 | 7/1937 | Parker | 303/54 |
| 3,031,234 | 4/1962 | Alfieri | 303/54 |
| 3,682,438 | 8/1972 | Klimek | 251/256 |

Primary Examiner—Robert G. Nilson
Attorney, Agent, or Firm—Eyre, Mann, Lucas & Just

[57] ABSTRACT

A manual fluid pressure controller has a handle with integral cam which mates with a non-rotating cam follower. Rotation of the handle causes displacement of the cam follower which transmits a force through a metering spring to a metering piston. The metering piston actuates a combined inlet-exhaust valve to admit or exhaust fluid pressure to its one face until the spring force on its other side is balanced. The fluid pressure at the face of the metering piston is connected to the load whose pressure it is desired to control. A cam stop, integral with the cam follower cooperates with a matching stop on the handle to limit handle travel.

5 Claims, 2 Drawing Figures

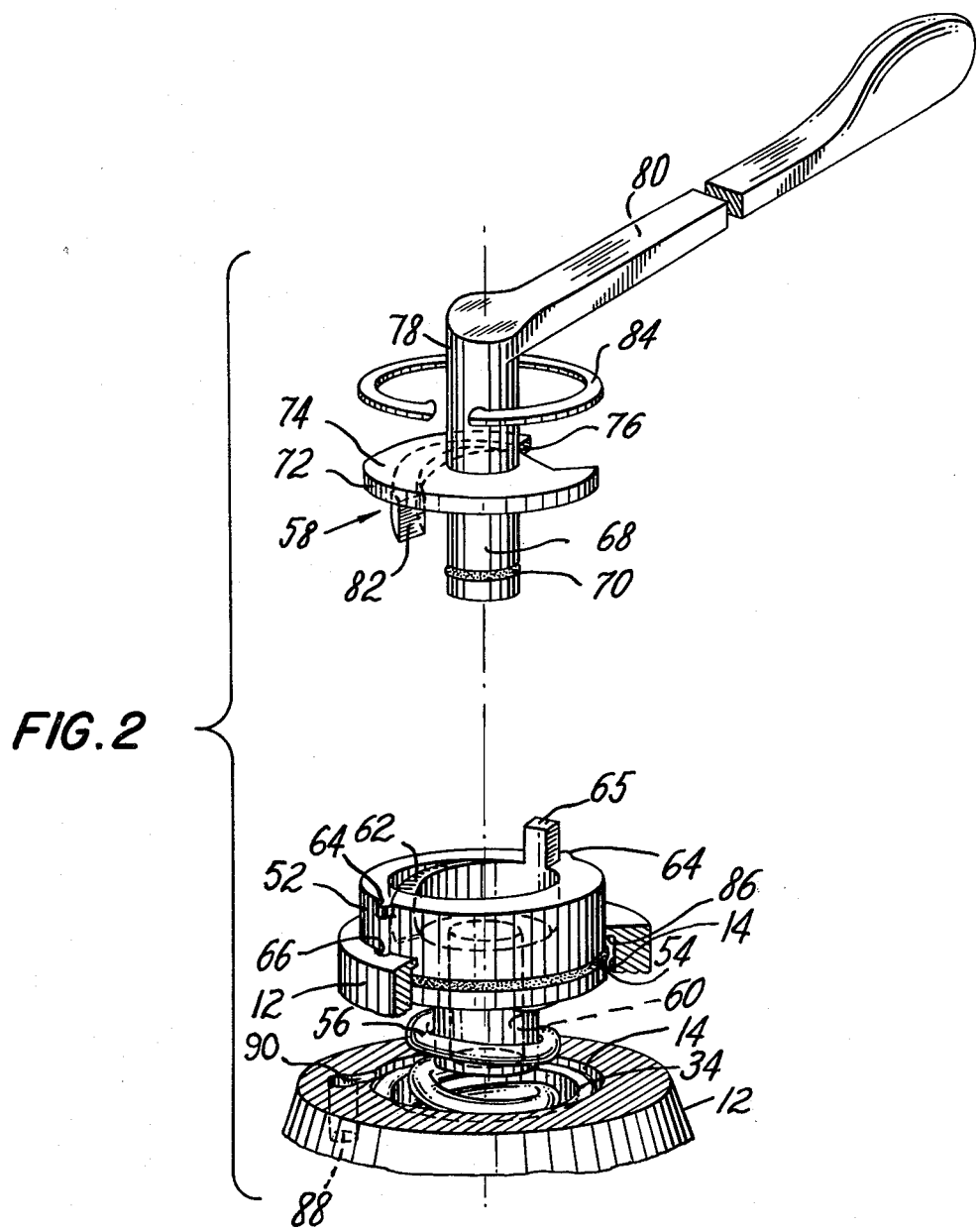

MANUAL FLUID PRESSURE CONTROLLER

BACKGROUND OF THE INVENTION

Manual fluid pressure controllers are used in automotive, particularly truck, applications, and in other areas where manual application of metered pressure is required. Treadle-type fluid pressure controllers, in which a manual linear displacement input, as from a brake treadle, meter an amount of fluid pressure proportional to the linear displacement input are also used. A fluid pressure controller adapted to operation by linear displacement is disclosed in U.S. Pat. No. 3,450,154. Hand fluid pressure controllers are conveniently operated by a rotary input. The hand controllers meter fluid pressure to their output in proportion to the magnitude of their angular rotation. A fluid pressure controller suitable for hand operation is disclosed in U.S. Pat. No. 3,682,438.

SUMMARY OF THE INVENTION

The present invention teaches a hand controller having an absolute minimum of parts. The unitary cam-handle converts handle rotation into proportional linear displacement of a cooperating cam piston. The linear displacement of the cam piston applies a force to one end of a spring whose other end bears against a metering piston. The metering piston has an integral exhaust valve seat aligned with a combined inlet-exhaust valve.

Upon being translated by rotation of the cam-handle, the integral exhaust valve of the metering piston seats and seals against one surface of the inlet-exhaust valve. This isolates the outlet from the atmosphere.

Upon slightly greater translation of the metering piston and integral exhaust valve seat, the combined inlet-exhaust valve is opened to admit fluid pressure into a delivery chamber which connects the fluid pressure to the load. The fluid pressure in the delivery chamber also acts on the metering piston to oppose the spring force. When the fluid pressure on the metering piston is great enough to just overcome the spring force, the metering piston is translated until the inlet-exhaust valve again closes and maintains the selected fluid pressure in the delivery chamber. An increase in the rotation of the cam handle again causes the inlet-exhaust valve to admit additional fluid pressure to the delivery chamber until a new balance is achieved. When the cam handle is rotated part way toward the off direction, the integral exhaust valve seat is moved out of its former sealing contact with the inlet-exhaust valve and permits some of the fluid pressure in the delivery chamber to be exhausted. When the reduced fluid pressure in the delivery chamber again balances the spring force, the metering piston is again translated toward the inlet-exhaust valve until the integral exhaust valve seat again makes sealing contact with the inlet-exhaust valve.

When the cam handle is rotated to the fully off position, the integral exhaust valve may be moved fully out of contact with the inlet-exhaust valve and, in that condition, maintains free fluid communication between the delivery chamber and the exhaust port.

A cam stop, integral with the cam follower limits the full-on and full-off travel of the cam handle.

BRIEF DESCRIPTION OF THE DRAWINGS

FIG. 2 shows an exploded partial perspective view of the controller.

DETAILED DESCRIPTION OF THE PREFERRED EMBODIMENT

Figure 1:
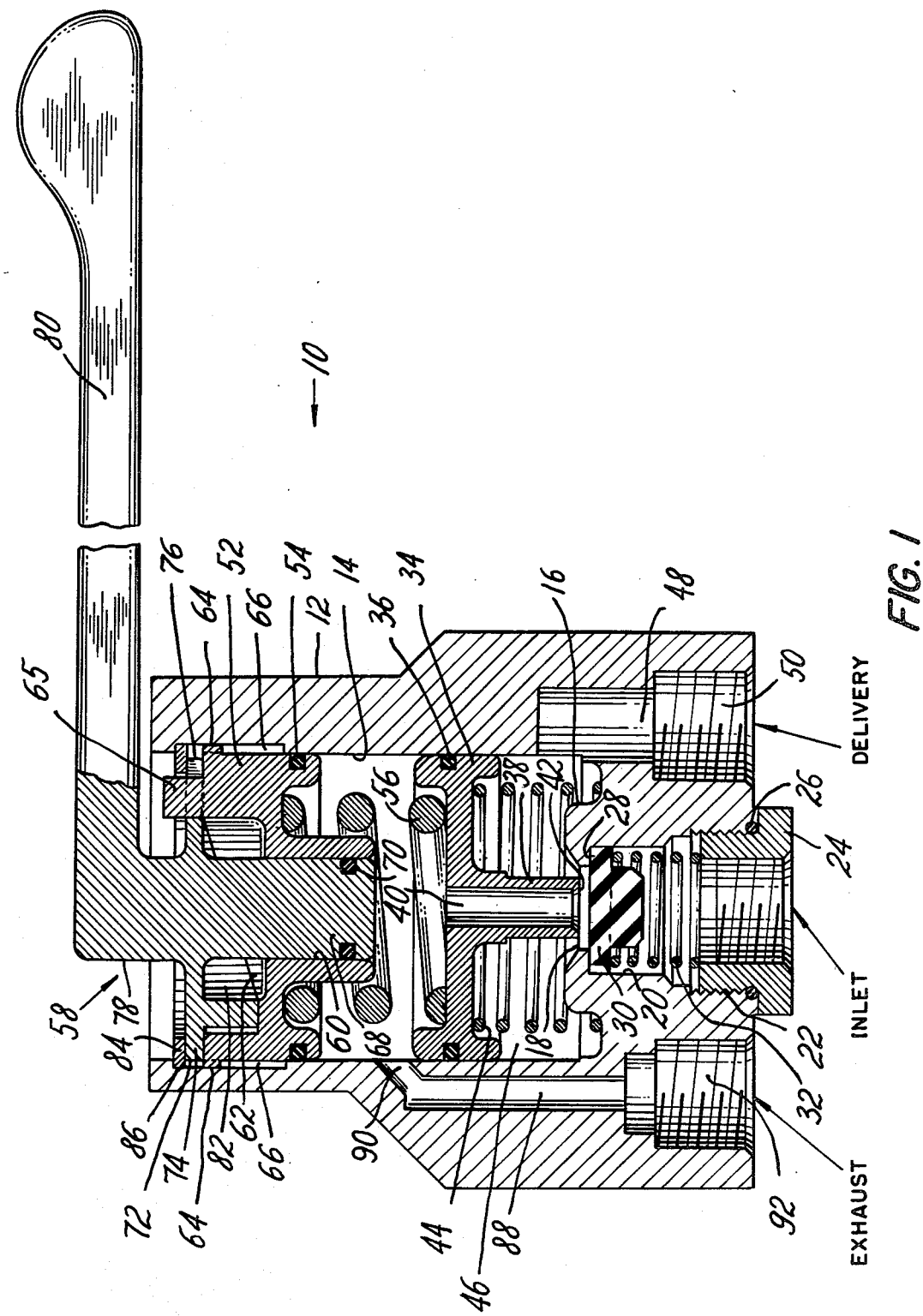
FIG. 1 shows an axial cross-sectional view of one embodiment of the invention.

Referring to FIG. 1, the controller 10 is contained in a body 12 having a cylindrical bore 14 therein. A base wall 16 having an axial opening 18 is located at the bottom of the cylindrical bore 14. A stepped counterbore 20 is axially located at the other side of the base wall 16. The stepped counterbore 20 is threaded at its outer end 22 to receive a pressure inlet fitting 24 sealed against pressure leakage by gasket 26. An annular inlet valve seat 28 overhangs and faces downward into the stepped counterbore 20. A resilient inlet-exhaust valve 30 is normally held in sealing contact with the inlet valve seat 28 by a spring 32 having negligible force and by the fluid pressure normally connected to pressure inlet fitting 24.

A metering piston 34, having a sealing piston ring 36 in its perimeter is located in the cylindrical bore 14 above the base wall 16 and is capable of axial displacement therein. An axial cylindrical extension 38 extends downward from the metering piston 34. The diameter of the cylindrical extension 38 is smaller than the axial opening 18 with which it is aligned. The cylindrical extension 38 and metering piston 34 contain an axial passage 40 passing axially completely through them. The extremity of the cylindrical extension 38 forms an exhaust valve seat 42. A return spring 44 of negligible strength is biased between the base wall 16 and the metering piston 34.

The region between the base wall 16 and the metering piston 34 comprises a delivery chamber 46. The delivery chamber 46 is in open fluid communication via a channel 48 with a delivery port 50. The delivery port 50 is threaded or otherwise adapted to receive a pressure fitting (not shown) which enables connection of the fluid pressure in the delivery port 50 to the load whose fluid pressure it is desired to control.

A cam piston 52 having a piston ring 54 on its perimeter is located in the cylindrical bore 14 above the metering piston 34. A metering spring 56, having non-negligible strength, is biased between the cam piston 52 and the metering piston 34. The exploded partial perspective view in FIG. 2 can also be referred to for better understanding of the manner in which the parts cooperate.

The cam piston 52 contains an axial guide bore 60 and a helical cam ramp 62, shown dashed in FIG. 2. A cam stop 65 extends upward from the cam piston 52. At least one, but preferably two guide lugs 64 protrude radially outward from the cam piston 52 and engage cooperating guide grooves 66 in the upper end of the cylindrical bore 14. The cam piston 52 is thus restrained from rotating within the cylindrical bore 14 but is enabled to axially displace within it.

The unitary cam-handle 58 is mounted above the cam piston 52. A guide shaft 68 on the unitary cam-handle 58 is guidingly fitted within the axial guide bore 60. The cooperation between the guide shaft 68 and the axial guide bore 60 stabilizes the lower end of the unitary cam-handle 58. A resilient seal 70 on the guide shaft 68 prevents leakage through the axial guide bore 60. The perimeter 72 of a skirt 74 on the unitary cam-handle 58 bears guidingly upon the cylindrical bore 14 and thereby stabilizes the upper end of the unitary cam-handle 58. A sector 76 of the skirt 74 is omitted. When assembled, the cam stop 65 protrudes upward through the sector 76 and positively limits the angular excursions of the unitary cam-handle 58. A handle shaft 78, integrally formed with the unitary cam-handle 58 extends upward from the top of the skirt 74. A handle 80 which may optionally be formed integrally with the unitary cam-handle 58 extends generally radially from the handle shaft 58. Optionally, a socket or other connection means may be provided on the handle shaft 78 and a separate handle 80 may be installed by any of the methods well known in the art such as, but not limited to, swaging, screw threads, welding, adhesives, bolts, rivets or hinges.

A helical cam ramp 82 extends downward from the skirt 74. The helical cam ramp 82 cooperates with helical cam ramp 62 on the cam piston 52. With the left-hand helices shown on the cam ramps 62, 82 clockwise rotation of the unitary cam-handle 58 tends to move the cam piston 52 away from the unitary cam handle 58. Control in the opposite sense is equally possible by reversing the sense of both helices.

A circlip 84 fitted into a retaining groove 86 bears on the skirt 74 and opposes upward forces on the unitary cam-handle 58.

An exhaust passage 88 terminates at one end in an opening 90 into the cylindrical bore 14 between the metering piston 34 and the cam piston 52. At its other end, the exhaust passage 88 terminates in an exhaust port 92 which may optionally be threaded for connection to a fitting (not shown).

Other configurations of controller, which would occur to one skilled in the art, would not depart from the spirit and scope of the present invention. For example, a unitary cam-handle 58 having two or more helical cam ramps 82 and a matching number of helical cam ramps 62 on the cam piston 52 are contemplated by the present invention.

Operation

In the full-off condition shown in FIG. 1, the unitary cam-handle 58 is in its fully counterclockwise off position. Atmospheric pressure air is freely connected between the exhaust port 92 and the delivery port 50 by way of exhaust passage 88, opening 90, axial passage 40, delivery chamber 46 and channel 48.

When the unitary cam-handle 58 is rotated clockwise, the cam piston 52 is displaced downward into the cylindrical bore 14. A downward force is transmitted through metering spring 56 onto metering piston 34. Metering piston 34 is displaced downward against the negligible force of its return spring 44 until the exhaust valve seat 42 makes sealing contact with the inlet-exhaust valve 30. Fluid communication between the exhaust port 92 and the delivery port 50 is cut off by the seal between the inlet-exhaust valve 30 and the exhaust valve seat 42.

With slightly greater angular displacement of the unitary cam-handle 58 in the on direction, the force transmitted from the cam piston 52 through the metering spring 56, metering piston 34 and cylindrical extension 38 is sufficient to urge the inlet-exhaust valve 30 out of sealing contact with the inlet valve seat 28. Pressurized fluid is admitted past inlet-exhaust valve 30 into the delivery chamber 46 and thence through passage 48 to the delivery port 50. The fluid pressure in the delivery chamber 46 acts across the area of the metering piston 34 to develop a force in the upward direction proportional to the fluid pressure in the delivery chamber 46. The pressure-derived upward force on the metering piston 34 opposes the downward force applied by the metering spring 56. At a fluid pressure in the delivery chamber 46 which is related to the angular position of the unitary cam-handle 58, the upward force on the metering piston 34 is just sufficient to compress the metering spring 56 until the inlet-exhaust valve 30 is raised into sealing contact with inlet valve seat 28. If no other changes occur, the controller remains in the "holding" mode just described in which the inlet-exhaust valve 30 remains in sealing contact with both the inlet valve seat 28 and the exhaust valve seat 42 and the desired fluid pressure is maintained in the delivery chamber 46 and the delivery port 50.

Additional rotation of the unitary cam-handle 58 in the on direction again displaces the inlet-exhaust valve 30 out of sealing contact with the inlet valve seat 28. Additional fluid pressure is admitted to the delivery chamber 46 until the upward pressure-derived force again overcomes the downward force from the metering spring 56. The clockwise rotation of the unitary cam-handle 58 is positively limited by abutment of the edge of the sector 76 against the cam stop 65.

When the unitary cam-handle 58 is rotated partly counter-clockwise from the holding mode, the exhaust valve seat 42 is raised out of sealing contact with the inlet-exhaust valve 30. Fluid pressure is exhausted from the delivery chamber 46 through the axial passage 40 and exhaust passage 88. As the fluid pressure is decreased in the delivery chamber 46, the pressure-derived upward force also decreases. At some intermediate pressure, the upward force has decreased to a value which allows the metering spring 56 to displace the exhaust valve seat 42 back into sealing contact with the inlet-exhaust valve 30. A new holding mode is entered at the new reduced fluid pressure.

When the unitary cam-handle 58 is rotated fully counter-clockwise to the off position, further rotation is positively limited by abutment of the edge of the sector 76 against the cam stop 65. The exhaust valve seat 42 is raised out of sealing contact with the inlet-exhaust valve 30. The controller returns to the full-off condition shown in FIG. 1 with free communication between the exhaust port 92 and the delivery port 50.

It will be understood that the claims are intended to cover all changes and modifications of the preferred embodiments of the invention, herein chosen for the purpose of illustration which do not constitute departures from the spirit and scope of the invention.

What is claimed is:

1. A manual fluid pressure controller comprising:
   (a) a housing;
   (b) means for connecting pressurized fluid to and from said housing;
   (c) exhaust means in said housing;
   (d) a valve in said housing between said means for connecting pressurized fluid to and from said housing;
   (e) a cylindrical cavity in said housing;
   (f) a metering piston having first and second sides coaxially disposed in said cylindrical cavity;
   (g) a cam handle having handle and cam parts;
   (h) said cam part being coaxially disposed in said cylindrical cavity and said handle part being outside said housing, said cam handle being capable of rotation between on and off positions;
   (i) a cam follower coaxially disposed in said cylindrical cavity cooperating with said cam for translation substantially without rotation of said follower upon the occurrence of rotation of said cam handle;
(j) resilient means biased between said cam follower and the first side of said metering piston;
(k) means for applying the fluid pressure in said means for connecting fluid pressure from said housing to the second side of said metering piston;
(l) a passage in said metering piston providing fluid communication between said second side and said exhaust means;
(m) means for sealing said passage when said cam handle is moved from its off position toward its on position;
(n) means on said metering piston for opening said valve whereby a metered amount of pressurized fluid is connected from said means for connecting to said housing to said means for connecting from said housing; and
(o) cooperating motion limiting abutment means on said cam handle and said cam follower to limit the rotary motion of said cam handle by abutment of said cooperating motion limiting abutment means between off and on positions.

2. The controller recited in claim 1 further comprising:
(a) said valve being an inlet-exhaust valve;
(b) said means for sealing being an exhaust valve seat on said metering piston; and
(c) said means for opening being the continued motion of said exhaust valve seat beyond the sealing position.

3. A manual fluid pressure controller comprising:
(a) a housing;
(b) means for connecting pressurized fluid to and from said housing;
(c) exhaust means in said housing;
(d) a valve in said housing between said means for connecting pressurized fluid to and from said housing;
(e) a cavity in said housing;
(f) a metering piston having first and second sides in said cavity;
(g) a cam handle having handle and cam parts;
(h) said cam part being in said cavity and said handle part being outside said housing, said cam handle being capable of rotation between on and off positions;
(i) a cam follower in said cavity cooperating with said cam for translation substantially without rotation of said cam follower upon the occurrence of rotation of said cam handle;
(j) resilient means biased between said cam follower and the first side of said metering piston;
(k) means for applying the fluid pressure in said means for connecting fluid pressure from said housing to the second side of said metering piston;
(l) a passage in said metering piston providing fluid communication between said second side and said exhaust means;
(m) means for sealing said passage when said cam handle is moved from its off position toward its on position;
(n) means on said metering piston for opening said valve whereby a metered amount of pressurized fluid is connected from said means for connecting to said housing to said means for connecting from said housing;
(o) means on said cam handle for interfering with a rotationally fixed motion limiting means whereby the rotary motion of said cam handle is limited between off and on positions; and
(p) said means on said cam handle being an arcuate slot and said motion limiting means being a boss engaging said arcuate slot.

4. In a manual fluid pressure controller which includes a housing and a metering piston therein for control of the application of fluid pressure in a brake system, the improvement which comprises:
(a) a cam follower positioned in said housing;
(b) resilient means biased between said cam follower and metering piston;
(c) a cam handle with associated cam member, said cam member being rotatably mounting in said housing in position to cooperate with said cam follower and move said cam follower to activate the metering piston controlling the application of fluid pressure in said brake system;
(d) means for retaining said cam member in said housing;
(e) means on said cam follower cooperating with means in said housing to prevent the rotation of said cam follower within said housing;
(f) projection on said cam follower; and
(g) means on said cam handle for interfering with said projection whereby the rotation of said cam handle is limited.

5. In a manual fluid pressure controller which includes a housing having a cylindrical cavity and a metering piston coaxially disposed therein for control of the application of fluid pressure in a brake system, the improvement which comprises:
(a) a cam handle with associated cam member, said cam member being coaxially rotatably mounted in said cylindrical cavity;
(b) resilient means bearing against said metering piston at its first end;
(c) follower means coaxially disposed at the second end of said resilient means for cooperating with said cam to apply force to the said second end to actuate the metering piston for controlling the application of said fluid pressure in said brake system;
(d) means for retaining said cam means in said housing;
(e) cooperating guide means in said cylindrical cavity and said follower means for permitting axial displacement thereof and for preventing rotation thereof; and
(f) cooperating motion limiting abutment means on said cam handle and said follower means for limiting the rotary motion of said cam handle by abutment of said cooperating motion limiting abutment means between off and on positions.

* * * * *